United States Patent [19]
Kimball

[11] Patent Number: 5,313,141
[45] Date of Patent: May 17, 1994

[54] THREE TERMINAL INVERTER FOR ELECTROLUMINESCENT LAMPS

[75] Inventor: Robert A. Kimball, Scottsdale, Ariz.

[73] Assignee: Durel Corporation, Tempe, Ariz.

[21] Appl. No.: 50,600

[22] Filed: Apr. 22, 1993

[51] Int. Cl.5 ............................................... G09G 3/10
[52] U.S. Cl. ............................... 315/169.3; 315/209 R;
315/226; 315/283; 315/362
[58] Field of Search ................ 315/169.3, 209 R, 223,
315/226, 283, 362, 205, 287

[56] References Cited

U.S. PATENT DOCUMENTS

| | | | |
|---|---|---|---|
| 3,908,150 | 9/1975 | Webb | 315/167 |
| 4,070,663 | 1/1978 | Kanatani et al. | 340/324 M |
| 4,208,869 | 6/1980 | Hanaoka | 368/84 |
| 4,253,097 | 2/1981 | Hochstrate | 315/169.3 X |
| 4,958,105 | 9/1990 | Young et al. | 315/169.3 |
| 5,027,040 | 6/1991 | Ikeda et al. | 315/169.3 |
| 5,227,696 | 7/1993 | Asars | 315/169.3 |

*Primary Examiner*—Robert J. Pascal
*Assistant Examiner*—Reginald A. Ratliff
*Attorney, Agent, or Firm*—Cahill, Sutton & Thomas

[57] ABSTRACT

An inverter for powering an electroluminescent lamp has a direct current supply terminal, a ground terminal, and a single output terminal. A high frequency pumping circuit stores electrical energy in an inductor having a first terminal and a second terminal. A switching circuit alternately connects the first and second terminals of the inductor to the output terminal at a low frequency. The output from the inverter is a high voltage, low frequency, alternating current.

15 Claims, 2 Drawing Sheets

THREE TERMINAL INVERTER FOR ELECTROLUMINESCENT LAMPS

BACKGROUND

This invention relates to inverters for electroluminescent (EL) lamps and, in particular, to an inverter which can be used with an EL lamp having one electrode grounded.

An EL lamp is essentially a capacitor having a dielectric layer including a phosphor powder which glows in the presence of a strong electric field and a very low current. The dielectric layer is held between two electrodes, one of which is transparent. Because the EL lamp is a capacitor, an alternating current (AC) must be applied to cause the phosphor to glow, otherwise the capacitor charges to the applied voltage and the current through the EL lamp ceases.

For wristwatches and other applications such as pocket pagers, an EL lamp is driven by an inverter which converts the direct current from a small battery into alternating current. The battery voltage, typically one to three volts, limits the voltage which can be applied to a lamp by the inverter. In order for the EL lamp to glow sufficiently, a peak-to-peak voltage in excess of one hundred and twenty volts is necessary. Converting from three volts to one hundred and twenty volts is difficult without a transformer and a transformer is too bulky and expensive for a wristwatch and for many other applications.

To increase the voltage across an EL lamp, the prior art teaches connecting the EL lamp across the AC diagonal of a bridge circuit and connecting the output from an inverter across the DC diagonal of the bridge circuit. The bridge circuit electrically reverses the connections between the EL lamp and the inverter, reversing the polarity of the applied voltage. The result is an approximate doubling of the voltage across the EL lamp and an alternating current through the lamp.

One technique for converting low voltage to high voltage uses a pump circuit in which energy is stored in an inductor. Typically, an inductor and switch transistor are connected in series across a battery. The junction of the switch transistor and the inductor is connected to one terminal on the DC diagonal of the bridge circuit. When the transistor shuts off, the collapsing field in the inductor generates a high voltage pulse. A series of such pulses charges the lamp and the lamp glows. The polarity of the applied pulses is reversed by the bridge circuit and the lamp then charges to about the same voltage but the opposite polarity.

The frequency of an alternating current through an EL lamp affects the life of the EL lamp, with frequencies below 1000 hz. being preferred. Too low of a frequency causes a noticeable flicker and low brightness. Thus, a frequency of 100-1000 hz. is preferred. Since the inductor and the lamp form a series resonant circuit, a large inductor is required for resonance at low frequencies. To overcome this problem, a high frequency (10-100 khz.) pulse train is combined with a low frequency pulse train and applied to the base of the switch transistor. By using bursts of high frequency pulses, the inductor can be made significantly smaller. If a bridge circuit is used, only the low frequency pulses are applied to the control electrodes of the switching devices in the bridge circuit.

A problem with bridge circuits is that the EL lamp must be electrically isolated in order to be able to connect the lamp to the AC diagonal of the bridge circuit. For many applications, e.g. watch faces, the lamp is nearly as wide as the package for the device, making isolation difficult. Being able to ground one electrode of the lamp simplifies construction of the device containing the lamp. More importantly, being able to ground one electrode enables one to drive a multi-segment display from a single inverter by individually grounding each segment through a series transistor. U.S. Pat. No. 3,908,150 discloses a multi-segment display in which each segment is separately grounded through a transistor.

Another problem with bridge circuits is stability, particularly bridge circuits using SCRs instead of transistors. The high voltage pulses from the inverter are coupled to the control electrodes of the transistors or SCRs by the parasitic capacitance inherent in the device, causing erratic triggering. Occasionally, an EL lamp is discharged when it is supposed to be charged and vice-versa. Stability becomes more of a problem as the input voltage to the bridge circuit is increased.

In view of the foregoing, it is therefore an object of the invention to provide an inverter which can be used with an EL lamp having one electrode grounded.

Another object of the invention is to provide an inverter having a single high voltage terminal for connection to an EL lamp.

A further object of the invention is to provide an inverter having sufficient voltage to drive an EL lamp without using a bridge circuit to reverse the connections to the lamp.

Another object of the invention is to provide an inverter for EL lamps in which the inverter includes an inductor having two terminals that are alternately connected to a single high voltage terminal of the inverter.

A further object of the invention is to provide an inverter in which power consumption is reduced by recycling the energy within the inverter.

SUMMARY OF THE INVENTION

The foregoing objects are achieved in the invention in which an inverter for powering an electroluminescent lamp includes a supply terminal, a ground terminal, and a high voltage terminal. A high frequency pumping circuit in the inverter stores electrical energy in an inductor having a first terminal and a second terminal. A switching circuit connected to said first terminal, said second terminal, and to said high voltage terminal, alternately connects the first and second terminals of the inductor to the high voltage terminal at a low frequency. An EL lamp connected between the high voltage terminal and the ground terminal receives a high voltage, low frequency, alternating current.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
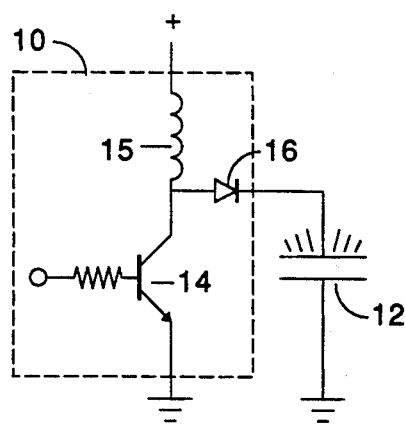
FIG. 1 is a schematic diagram of a pumping circuit constructed in accordance with the prior art.

An inverter for EL lamps is typically what is known as a "flyback" inverter in which the energy stored in an inductor is supplied to the EL lamp as a small current at high voltage. In FIG. 1, inverter 10 supplies a series of high frequency pulses to lamp 12. A pulse is produced each time transistor 14 turns off, permitting the junction of transistor 14 and series inductor 15 to rise in voltage. Since transistor 14 was conducting, the current through inductor 15 established a field proportional to the current and the inductance of inductor 15. When transistor 14 shuts off, the field collapses at a rate determined by the turn-off characteristics of transistor 14 and the voltage across inductor 15 is proportional to $\delta i/\delta t$. Thus, a low voltage / high current is converted into a high voltage / low current. Each time transistor 14 turns off, the same amount of energy is applied to lamp 12 and the voltage on the lamp is pumped up by a series of current pulses from the inverter. Diode 16 prevents lamp 12 from discharging through transistor 14. Inverter 10 is insufficient to power an EL lamp from a three volt source. A bridge circuit must be added to double the voltage and to reverse the polarity of the lamp periodically to produce an alternating current.

Figure 2:
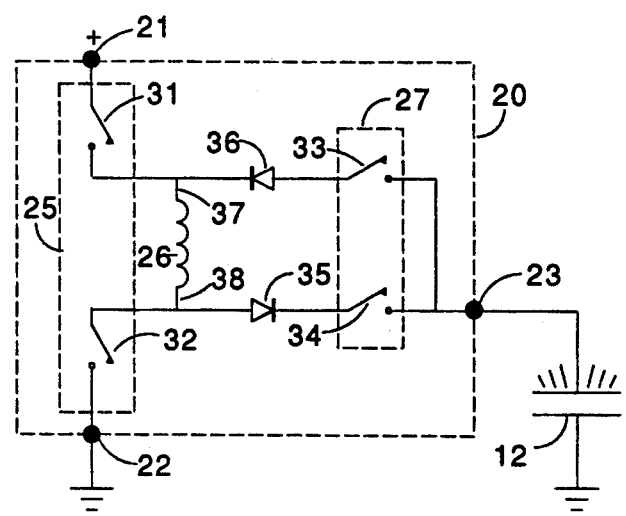
FIG. 2 is a schematic diagram of a pumping circuit constructed in accordance with the invention.

FIG. 2 is a functional diaphragm of an inverter constructed in accordance with the invention. Inverter 20 is a three terminal device having supply terminal 21, ground terminal 22, and high voltage terminal 23. Within inverter 20, first switching circuit 25 pumps current pulses through inductor 26 and second switching circuit 27 connects current pulses from inductor 26 to EL lamp 12 through high voltage terminal 23.

Switching circuit 25 includes switches 31 and 32 forming a series circuit with inductor 26 between supply terminal 21 and ground terminal 22. Switching circuit 27 includes switches 33 and 34 connected between each end of inductor 26 and high voltage terminal 23. Specifically switch 33 is connected between end 37 of inductor 26 and high voltage terminal 23. Switch 34 is connected between end 38 of inductor 26 and high voltage terminal 23.

When switches 31 and 34 are closed (conducting) and switch 33 is open (non-conducting), the circuit operates in the same manner as the circuit of FIG. 1. Specifically, switch 32 is open and closed at a high frequency producing a series of high voltage pulses which are connected from terminal 38 of inductor 26 through switch 34 to high voltage terminal 23. When switch 32 opens, the field on inductor 26 collapses, attempting to maintain the current flowing in the same direction as before switch 32 opened. The only current path remaining is through switch 34 to lamp 12, charging the upper electrode of lamp 12 positively. Diode 35 blocks current from lamp 12 to ground when switch 32 is closed.

For the second half of the cycle, switch 32 closes and remains closed, switch 34 opens and remains opened, and switch 33 closes and remains closed. Switch 31 is opened and closed at a high frequency rate, producing a series of current pulses through inductor 26. During this half of the cycle, terminal 37 of inductor 36 is connected through switch 33 to lamp 12. When switch 31 opens, the collapsing field in inductor 26 tries to maintain the current flowing in the same direction as before switch 31 opened. Since terminal 37 is connected to lamp 12, this current is drawn from lamp 12, discharging the upper electrode of lamp 12 and eventually charging the upper electrode negatively. Diode 36 blocks current from lamp 12 to supply terminal 21 when switch 31 is closed. After a given number of high frequency pulses, the upper electrode of lamp 12 is at a peak voltage and the cycle ends.

Figure 3:
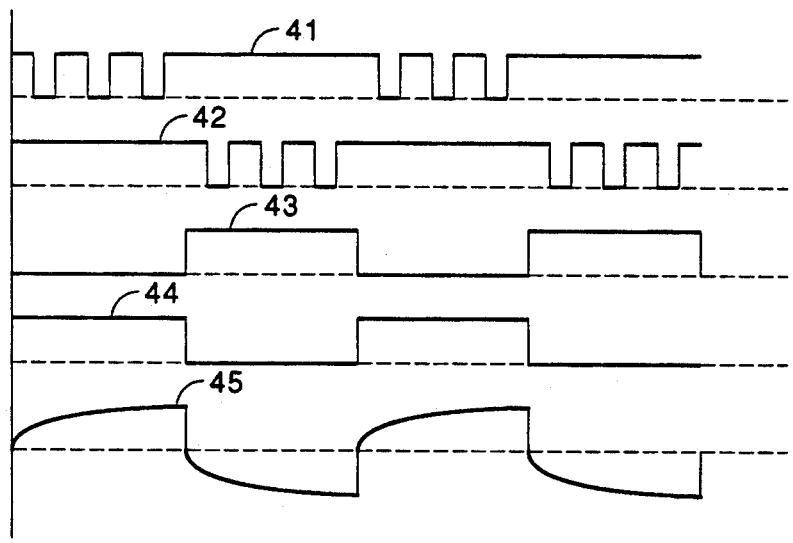
FIG. 3 is a chart of waveforms showing the operation of the circuit illustrated in FIG. 2.

The waveforms in FIG. 3 illustrate the operation of switches 31-34 and the resulting voltage across lamp 12. Waveform 41 shows the operation of switch 32 which is initially closed and then opened intermittently at a high frequency during the first half cycle of low frequency waveform 43. Waveform 42 illustrates the operation of switch 31 which is closed during the first half cycle of waveform 43 and then opened intermittently during the second half cycle. Waveform 43 shows the operation of switch 33 which is opened and closed at low frequency. Waveform 44 illustrates the operation of switch 34 which is opened and closed oppositely to switch 33. Waveform 45 shows the voltage on electroluminescent lamp 12 increasing during the first half of the cycle of waveform 43. At the end of the first half of the cycle, lamp 12 is discharged and is then charged negatively to a peak voltage during the second half cycle. At the end of the second half cycle, lamp 12 is discharged and then charged positively as described above, producing an alternating current through the lamp without a bridge circuit and without isolating both electrodes of the lamp.

Figure 4:
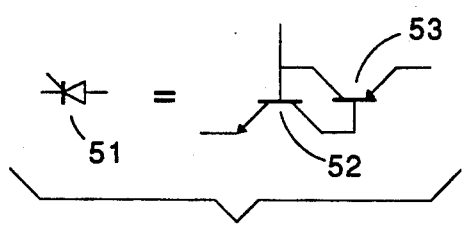
FIG. 4 illustrates an alternative construction of an SCR.
Figure 5:
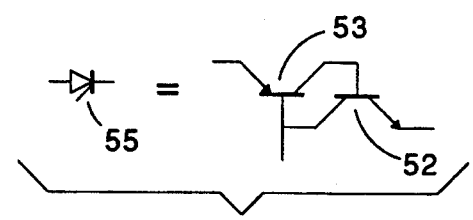
FIG. 5 illustrates an alternative construction of a silicon controlled switch.

Discrete SCRs are typically designed with minimal parasitic capacitance to reduce auto-triggering of the SCR in typical switching applications. Auto-triggering occurs when pulses are coupled to the gate of the SCR by the parasitic capacitance between the gate and the anode or cathode of the SCR. In bridge circuits, auto-triggering causes instability. A complementary pair of transistors connected in SCR configuration has a greater parasitic capacitance than a discrete SCR. As shown in FIG. 4, SCR 51 can be implemented instead as a pair of complementary transistors 52 and 53 connected in an SCR configuration. In particular, NPN transistor 52 has its base connected to the collector of PNP transistor 53 and its collector connected to the base of transistor 53. The base of the NPN transistor is the gate of the SCR. In FIG. 5, silicon controlled switch (SCS) 55 is implemented as the same complementary pair of transistors as shown in FIG. 4, except that the base of the PNP transistor is used as the gate electrode for the switch.

Figure 6:
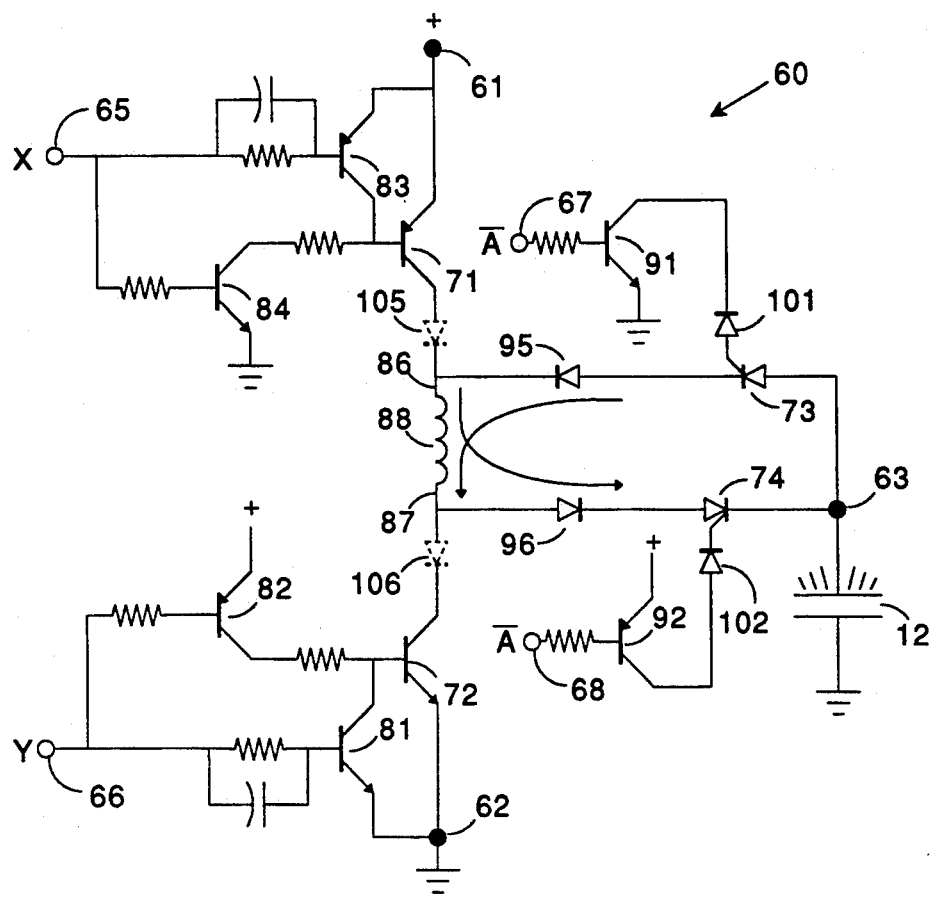
FIG. 6 is a schematic diagram of an inverter constructed in accordance with a preferred embodiment of the invention.

FIG. 6 illustrates an inverter suitable for powering watches and other small area displays. Inverter 60 includes supply terminal 61, ground terminal 62, and high voltage terminal 63. One electrode of lamp 12 is connected to high voltage terminal 63 and the other electrode of lamp 12 is grounded. Control terminals 65-68 are labelled A, X, or Y and receive the correspondingly labelled signals illustrated in FIG. 4. Transistor 71 is connected between supply terminal 61 and inductor 88 and transistor 72 is connected between inductor 88 and ground. SCR 73 is connected between high voltage terminal 63 and end 86 of inductor 88. SCS 74 is connected between high voltage terminal 63 and end 87 of inductor 88. SCR 73 and SCS 74 form a single pole, double throw switch between the ends of inductor 88 and terminal 63.

The drive circuitry connected to the base of switch 72 assures more rapid switching of switch 72 than if resistive coupling alone were used. Specifically, transistor 81 drains the emitter-base capacitance of transistor 72, causing transistor 72 to turn off more quickly. Transistor 82 supplies base current to transistor 72 and assures that transistor 72 turns on more quickly and saturates. In the same manner, transistor 83 turns off transistor 71 and transistor 84 turns on transistor 71.

Figure 7:
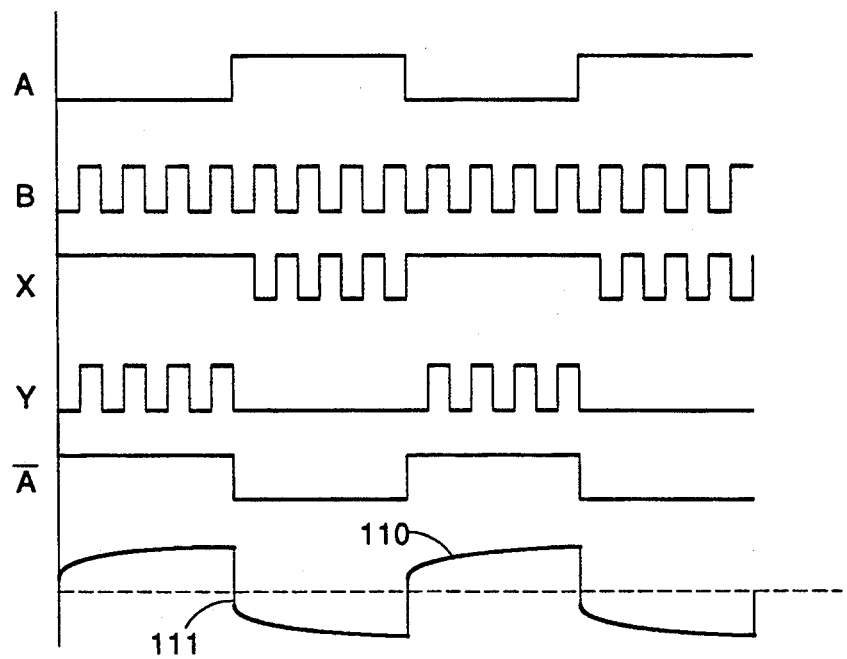
FIG. 7 is a chart of the control signals used in the circuit illustrated in FIG. 4.

In FIG. 7, signal A is a 100–1000 hz signal having a fifty percent duty cycle. Signal B is a 10 khz–100 khz signal having a 10–50 percent duty cycle. Signal $\overline{A}$ is the logical inverse of signal A, read as "A NOT." Signal X is obtained by combining signals A and B in a logical NAND (AND plus inverter) circuit. Signal Y is obtained by combining signals and $\overline{A}$ and B in an AND circuit. Stated algebraically, $X = \overline{A \cdot B}$ and $Y = \overline{A} \cdot B$.

In operation, ends 86 and 87 of inductor 88 are alternately connected to high voltage terminal 63 by switches 73 and 74. When signal X is high, transistor 84 is turned on and turns on transistor 71. Transistor 71 conducts current from supply terminal 61 to inductor 88. While signal A is low, signal Y turns transistor 72 on and off intermittently at a high frequency. When transistor 72 is turned off, the field around inductor 88 collapses at a high rate, generating a high voltage, positive pulse which is conducted from inductor 88 through diode 96 and SCR 74 to lamp 12. When transistor 72 is turned on, the current through inductor 88 stores energy in the field in preparation for the generation of the next pulse.

When signal $\overline{A}$ is high, transistor 91 is conducting and transistor 92 is nonconducting. When transistor 92 is nonconducting, SCS 74 is enabled and conducts pulses to high voltage 63. The positive pulses are capacitively coupled to the gate electrode of SCS 74 by the parasitic capacitance between the electrodes, auto-triggering SCS 74.

When signal Y is low (i.e. when $\overline{A}$ is low), transistor 82 conducts and transistor 72 is turned on and stays on while Y is low. During this half cycle, signal X is pulsed at high frequency, turning transistor 71 on and off at a high frequency. When transistor 71 is conducting, the field around inductor 88 is charged and when transistor 71 is turned off, the field collapses, producing a negative, high voltage pulse which is conducted through diode 95 and SCR 73 to lamp 12.

When $\overline{A}$ is low, transistor 91 is turned off, enabling SCR 73 and transistor 92 is turned on, disabling SCS 74. The negative pulses from end 86 from inductor 88 are coupled to the gate of SCR 73, turning the SCR on. Diode 95 turns off more quickly under reverse bias than SCR 73 and diode 96 turns off more quickly under reverse bias than SCS 74, improving the switching characteristics of the circuit. Diode 101 prevents base-collector current in transistor 91 from triggering SCR 73 and diode 102 prevents base-collector current in transistor 92 from triggering SCS 74, improving circuit stability. Unlike bridge circuits of the prior art, auto-triggering does not cause instability since the bias on the gates of SCR 73 and SCS 74 is sufficient to reliably prevent the SCR or SCS from triggering at the wrong time.

During each cycle of signal A, positive then negative pulses are applied to lamp 12, charging the capacitance of lamp 12 positively then negatively. As indicated by the arrows, the current through inductor 88 is unidirectional, i.e. pulsed direct current. However, the current through lamp 12 is an alternating current having a period equal to the period of signal A.

The following is a list of the components used in an embodiment of FIG. 6. It is understood that the specific components listed is by way of example only.
  All PNP transistors: MPSA-05
  All NPN transistors: MPSA-56
  SCR 73 & SCS 74: complementary transistors connected as shown in FIGS. 4 and 5
  All diodes: 1N914
  All capacitors: 1000 pf.
  Base resistor, transistors 71 and 72: 2k Ω
  All other resistors: 10Ω

As describe thus far, the circuit of FIG. 6 is suitable for low voltage applications, e.g. watches or pocket pagers. In FIG. 3, lamp 12 discharges into the battery at the beginning of each half cycle of waveform 43. For example, after the upper electrode of lamp 12 is charged positively, switch 34 is opened and switch 33 is closed. Lamp 12 discharges through switch 33, diode 36, and switch 31 to the power supply connected to terminal 21. In an alternative embodiment of the invention, diodes 105 and 106 are added to prevent lamp 12 from discharging into the power supply at the beginning of each half cycle. Diode 105 blocks the positive pulse when SCR 73 conducts and diode 106 blocks the negative pulse when SCS 74 conducts.

With diodes 105 and 106, the circuit of FIG. 6 operates slightly differently. Instead of being discharged through the power supply at the beginning of each half cycle, lamp 12 discharges through inductor 88, storing energy in the inductor. This energy is re-cycled to the lamp by the next high frequency pulse in the half cycle, producing a higher initial voltage on each half cycle, as shown at 111 in waveform 110, reducing the power consumption of the inverter. This embodiment is preferred for DC supplies having a voltage greater than three volts since the forward voltage drops in the low voltage circuit reduce the voltage drop across inductor 88 relatively less than when DC supply having a voltage less than three volts is used.

The low voltage path includes transistor 71, diode 105, inductor 88, diode 106, and transistor 72. For silicon devices, the forward voltage drop of a saturated (fully conducting) transistor is about 0.2 volts and the forward voltage drop of a diode is about 0.6 volts. If a three volt battery is used, the maximum voltage across the inductor is only 1.4 volts. Without diodes 105 and 106, the maximum voltage across inductor 88 is 2.6 volts. A higher voltage proportionately reduces the amount of current which must pass through inductor 88 for the same amount of energy to be transferred per pulse from the inverter to the lamp. A reduced current increases the life of the battery and permits one to use lithium batteries, which have a long life but cannot produce high current.

The invention thus provides an inverter which can be used with an EL lamp having a grounded electrode. The inverter has a single high voltage terminal for connection to an EL lamp and does not require the use of a bridge circuit for reversing the connections to the lamp. The inverter can be powered by a low voltage battery in pager and watch applications. For applications using higher supply voltages, the inverter can be made somewhat more efficient by the addition of diodes 105 and 106.

Having thus described the invention, it will be apparent to those of skill in the art that various modifications can be made within the scope of the invention. For example, while illustrated as using bipolar transistors of a particular type, it is understood that the polarity of the transistors can be reversed; i.e. NPN transistors can be substituted for PNP transistors and vice-versa. Similarly, while disclosed in a preferred embodiment using bipolar transistors, it is understood that field effect transistors (FETs) can be used instead. The control signals in FIG. 7 are readily obtained using logic circuits well known per se in the art.

I claim:

1. An inverter for powering an electroluminescent lamp, said inverter including a supply terminal, a ground terminal, a high voltage terminal, and an inductor having a first terminal and a second terminal, wherein said inverter further comprises:
   a first switching circuit connected to said supply terminal and said inductor, said first switching circuit pumping electrical energy from said supply terminal to said inductor;
   a second switching circuit connected to said first terminal, said second terminal, and to said high voltage terminal, said second switching circuit alternately connecting said first terminal and said second terminal to said high voltage terminal.

2. The inverter as set forth in claim 1 wherein said first switching circuit includes:
   a first transistor connected between said first terminal and said supply terminal; and
   a second transistor connected between said second terminal and said ground terminal.

3. The inverter as set forth in claim 2 wherein said first switching circuit further includes:
   a first diode connected between said first transistor and said first terminal; and
   a second diode connected between Said second terminal and said second transistor.

4. The inverter as set forth in claim 1 wherein said second switching circuit comprises:
   a first semiconductor switch connected between said first terminal and said high voltage terminal; and
   a second semiconductor switch connected between said second terminal and said high voltage terminal.

5. The inverter as set forth in claim 4 wherein said first semiconductor switch and said second semiconductor switch each comprise a silicon controlled switch.

6. The inverter as set forth in claim 4 wherein said first semiconductor switch and said second semiconductor switch each comprise a complementary pair of transistors connected in SCR configuration.

7. The inverter as set forth in claim 4 wherein the said second switching circuit further includes
   a first diode in series with said first semiconductor switch, and
   a second diode in series with said second semiconductor switch.

8. A display comprising:
   an electroluminescent lamp having a first electrode and a second electrode; and
   an inverter for powering said electroluminescent lamp, said inverter including:
   (i) a supply terminal,
   (ii) an output terminal connected to said first electrode,
   (iii) a ground terminal connected to said second electrode, and
   (iv) an inductor having a first terminal and a second terminal,
   (v) a first switching circuit connected to said supply terminal and said inductor, said first switching circuit pumping electrical energy from said supply terminal to said inductor, and
   (vi) a second switching circuit connected to said first terminal, said second terminal, and to said output terminal, said second switching circuit alternately connecting said first terminal and said second terminal to said output terminal.

9. The display as set forth in claim 8 wherein said electroluminescent lamp includes more than two electrodes.

10. An inverter for powering an electroluminescent lamp, said inverter comprising:
    an inductor having a first terminal and a second terminal;
    a first switching circuit connected to said inductor for conducting high frequency electrical pulses through said inductor;
    an output terminal;
    a second switching circuit connected to said inductor for alternately connecting said first terminal and said second terminal to said output terminal at a low frequency.

11. The inverter as set forth in claim 10 wherein said first switching circuit includes a pair of diodes for recycling energy from said lamp back to said lamp at the beginning of each half cycle of said low frequency.

12. A method for powering an electroluminescent lamp having a first electrode and a second electrode, wherein said first electrode is connected to a circuit ground, said method comprising the steps of:
    (i) intermittently passing a direct current through an inductor having a first terminal and a second terminal while connecting only said first terminal to said second electrode of said lamp; then
    (ii) intermittently passing a direct current through said inductor while connecting only said second terminal to said second electrode of said lamp; and
    (iii) repeating steps (i) and (ii) to produce an alternating current through said lamp.

13. The method as set forth in claim 12 wherein said first and second terminals are alternately connected to said second electrode at a low frequency to produce a low frequency alternating current through said lamp.

14. The method as set forth in claim 13 wherein said direct current is intermittent at a high frequency.

15. The method as set forth in claim 12 wherein said direct current is intermittent at a high frequency.

* * * * *